US009126847B2

(12) United States Patent
Moriyama et al.

(10) Patent No.: US 9,126,847 B2
(45) Date of Patent: Sep. 8, 2015

(54) LITHIUM TITANATE, ELECTRODE ACTIVE MATERIAL AND ELECTRICITY STORAGE DEVICE EACH COMPRISING THE SAME

(75) Inventors: Nariaki Moriyama, Yokkaichi (JP); Masatoshi Honma, Yokkaichi (JP); Kazuyoshi Takeshima, Yokkaichi (JP); Yusuke Okuda, Yokkaichi (JP); Naoya Nagahashi, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 545 days.

(21) Appl. No.: 13/321,973

(22) PCT Filed: May 25, 2010

(86) PCT No.: PCT/JP2010/058815
§ 371 (c)(1),
(2), (4) Date: Nov. 22, 2011

(87) PCT Pub. No.: WO2010/137582
PCT Pub. Date: Dec. 2, 2010

(65) Prior Publication Data
US 2012/0070744 A1 Mar. 22, 2012

(30) Foreign Application Priority Data
May 26, 2009 (JP) ................................. 2009-126029

(51) Int. Cl.
*H01M 4/485* (2010.01)
*C01G 23/00* (2006.01)
*H01M 4/131* (2010.01)

(52) U.S. Cl.
CPC ............ *C01G 23/005* (2013.01); *H01M 4/131* (2013.01); *H01M 4/485* (2013.01);
(Continued)

(58) Field of Classification Search
None
See application file for complete search history.

(56) References Cited

U.S. PATENT DOCUMENTS

| 2007/0009798 A1 | 1/2007 | Inagaki et al. |
| 2008/0176142 A1 | 7/2008 | Inagaki et al. |
| 2008/0285211 A1* | 11/2008 | Zaghib et al. ................. 361/528 |

FOREIGN PATENT DOCUMENTS

| CN | 101373829 | 2/2009 |
| EP | 1 207 572 A1 | 5/2002 |

(Continued)

OTHER PUBLICATIONS

Hsio, K.C. et al. "Microstructure effect on the electrochemical property of Li4Ti5O12 as an anode material for lithium-ion batteries" Electrochimica Acta, vol. 53, No. 24 Oct. 15, 2008.

(Continued)

*Primary Examiner* — Patrick Ryan
*Assistant Examiner* — Lucas J O'Donnell
(74) *Attorney, Agent, or Firm* — Paul E. White, Jr.; Manelli Selter PLLC (57) ABSTRACT

Disclosed is lithium titanate having excellent rate properties and useful for electricity storage devices, which is produced by preparing lithium titanate secondary particles that are aggregates of lithium titanate primary particles and forming at least macro-pores on the surfaces of the secondary particles. The lithium titanate can be produced by a process which comprises drying and granulating a slurry comprising crystalline titan oxide, a titanic acid compound and a lithium compound and firing the granulated product to thereby produce lithium titanate secondary particles, wherein (1) the crystalline titan oxide to be used comprises at least two types of crystalline titan oxide particles having different average particle diameters from each other, and/or (2) the crystalline titan oxide is used in an amount at least four-fold larger than that of the titanic acid compound in terms of $TiO_2$ content by weight. The lithium titanate can achieve a satisfactory level of charge-discharge capacity for practical uses when used in a electricity storage device without requiring the use of a carbon-containing substance, such as carbon black, acethylene black or Ketjen black, as an electrically conductive material in combination, in spite of a fact that lithium titanate has an electrically insulating properties by nature.

8 Claims, 1 Drawing Sheet

(52) U.S. Cl.
CPC ........ *C01P 2004/45* (2013.01); *C01P 2006/12* (2013.01); *C01P 2006/14* (2013.01); *C01P 2006/16* (2013.01); *C01P 2006/40* (2013.01); *Y02E 60/122* (2013.01)

(56) References Cited

FOREIGN PATENT DOCUMENTS

| JP | 7-053214 A | 2/1995 |
|---|---|---|
| JP | 10-251020 A | 9/1998 |
| JP | 2001-192208 A | 7/2001 |
| JP | 2002-117832 A | 4/2002 |
| JP | 2002-211925 A | 7/2002 |
| JP | 2005-239460 A | 9/2005 |
| JP | 2005-239461 A | 9/2005 |
| JP | 2006-306952 A | 11/2006 |
| JP | 2007-018883 | 1/2007 |
| WO | WO 2009/028553 | 3/2009 |

OTHER PUBLICATIONS

Kuang-Che Hsiao et al, "Microstructure effect on the electrochemical property . . . for lithium-ion batteries" Electrochimica Acta, 2008, vol. 53, Issue 24, p. 7242-7247.

* cited by examiner

US 9,126,847 B2

LITHIUM TITANATE, ELECTRODE ACTIVE MATERIAL AND ELECTRICITY STORAGE DEVICE EACH COMPRISING THE SAME

TECHNICAL FIELD

The present invention relates to a lithium titanate having good properties for battery particularly excellent rate property and a process for production of the same. The present invention also relates to an electrode active material comprising the lithium titanate, and an electricity storage device using an electrode comprising the electrode active material.

BACKGROUND ART

Lithium secondary batteries have high energy density and good cycle performance. Accordingly, recently, these have been rapidly used as small-sized batteries for a power supply for portable devices or the like. On the other hand, development for large-sized batteries for the electric power industry, automobiles and the like has been demanded. These large-sized lithium secondary batteries need to comprise an electrode active material having long-term reliability and high input and output properties. Particularly, for the negative electrode active material, lithium titanate having high security, long life, and excellent rate property has been expected, and a variety of lithium titanate has been proposed for the electrode active material. For example, a lithium titanate is known which is granulated into spherical secondary particles to improve packing properties, and thereby to improve battery properties (Patent Documents 1 and 2). Such lithium titanate secondary particles are produced by granulating with drying a titanium compound and a lithium compound, and firing the granulated product. Further, in order to improve the discharge capacity of the lithium titanate secondary particles, a process in which a slurry comprising crystalline titanium oxide, a titanic acid compound, and a lithium compound is granulated with drying, and then the granulated product is heated and fired employs a process such as a process of preparing the slurry by adding a crystalline titanium oxide and a titanic acid compound to a solution of a lithium compound preheated to 50° C. or more (Patent Document 3), or a process of preparing the slurry at a temperature of less than 45° C. (Patent Document 4). On the other hand, a technique is known in which lithium titanate is crushed and fired again to form pores having an average pore size in the range of 50 to 500 Å on the surface of the particle of lithium titanate, thereby improving high current properties and cycle performance (Patent Document 5).

CITATION LIST

Patent Documents

PATENT DOCUMENT 1: JP 2001-192208 A
PATENT DOCUMENT 2: JP 2002-211925 A
PATENT DOCUMENT 3: JP 2005-239460 A
PATENT DOCUMENT 4: JP 2005-239461 A
PATENT DOCUMENT 5: JP 2007-18883 A

DISCLOSURE OF THE INVENTION

Problems to be Solved by the Invention

The present invention provides a lithium titanate having good properties for battery particularly excellent rate property and a process for production of the same.

Means for Solving the Problems

As a result of extensive research, the present inventors found out that the secondary particle of a lithium titanate having at least macropores on the surface thereof has more excellent rate property, and that such a lithium titanate can be obtained as follows: two or more kind of particles are used as a crystalline titanium oxide, or the crystalline titanium oxide and a titanic acid compound are blended in a specific ratio at the previous mentioned process of drying and granulating a slurry comprising the crystalline titanium oxide, a titanic acid compound, and a lithium compound, and firing the granulated product to obtain the secondary particles of the lithium titanate. Thus, the present invention has been completed.

Namely, the present invention is a lithium titanate comprising a secondary particle of aggregated lithium titanate primary particles and having at least macropores on the surface of the secondary particle, and a process for production of a lithium titanate, comprising the steps of: drying and granulating a slurry comprising a crystalline titanium oxide, a titanic acid compound, and a lithium compound; and firing a resultant product to obtain lithium titanate secondary particles, wherein (1) the crystalline titanium oxide comprising at least two kind of crystalline titanium oxide particles having different average particle sizes is used, and/or (2) the amount of the crystalline titanium oxide to be used is more than 4 times larger than that of the titanic acid compound in the weight ratio in terms of $TiO_2$.

Advantage of the Invention

An electricity storage device using the lithium titanate according to the present invention for an electrode active material has good battery performances, particularly excellent rate property.

MODE FOR CARRYING OUT THE INVENTION

The present invention is a lithium titanate comprising a secondary particle of aggregated lithium titanate primary particles and having at least macropores on the surface of the secondary particle. In the present invention, the lithium titanate is the secondary particle. Accordingly, depressions and projections, and gaps between the primary particles are formed on the surface of the secondary particle. Thereby, the lithium titanate can have a larger contact area with an electrolyte solution to increase the amount of lithium ions adsorbed and desorbed. In addition, the depressions and projections, the gaps between the primary particles, and the like on the surface of the secondary particle form macropores, i.e., pores having pore size of 50 nm or more. Accordingly, the lithium titanate according to the present invention has less load in adsorption and desorption of lithium ions than those having micropores with a pore size of 2 nm or less or mesopores with a pore size of 2 to 50 nm. For this reason, it is presumed that excellent rate property can be obtained. Usually, the pore size of a powder is determined as follows: the nitrogen adsorption and desorption isotherms determined by the nitrogen adsorption method are analyzed by an HK method, a BJH method or the like to determine pore distribution, and using the total volume of pores calculated from the pore distribution and the measured value of the specific surface area, the pore size of the powder is determined. It is said, however, that these methods can measure the pore sizes of the micropore and the mesopore relatively correctly while the measured value of the pore size of the macropore has very low accuracy. On the other hand, it is said that in the adsorption and desorption isotherms, a larger amount of nitrogen adsorbed at a higher pressure in the relative pressure indicates presence of the macropore. In the present invention, in the case where the amount of nitrogen adsorbed at a relative pressure of 0.99 (written as $V_{a(0.99)}$) is 50 cm$^3$(STP)/g or more, it is determined that the lithium titanate has macropores. In the present invention, "cm$^3$(STP)/g" represents a value obtained by converting the amount of nitrogen adsorbed and desorbed into a volume in a standard state (temperature of 0° C., atmospheric pressure of 101.3 KPa). More preferably, $V_{a(0.99)}$ is at least 55 cm$^3$(STP)/g.

Further, if few micropores and mesopores exist on the surface of the secondary particle, load is further reduced in adsorption and desorption of lithium ions, leading to more excellent rate property. It is said that the existence of few mesopores and micropores exist is shown by, in the adsorption and desorption isotherms, a small amount of nitrogen adsorbed at a low pressure in the relative pressure, and no remarkable difference in shape between the adsorption isotherm and the desorption isotherm, namely, no occurrence of hysteresis between the adsorption isotherm and the desorption isotherm. No occurrence of hysteresis can be specifically shown by that the difference (written as $\Delta V_{d-a}$) between the amount of nitrogen desorbed and the amount of nitrogen adsorbed is very small when measurement is made at an interval of the relative pressure of 0.05 in the range of 0.45 to 0.90, for example. In the present invention, it is determined that the surface of the secondary particle has neither micropore nor mesopore in the case where the amount of nitrogen adsorbed at a relative pressure of 0.50 (written as $V_{a(0.50)}$) is 10 cm$^3$(STP)/g or less, and $\Delta V_{d-a}$ does not continuously take values of 5 cm$^3$(STP)/g or more, namely, the values of $\Delta V_{d-a}$ at the continuing two or more measurement points are not 5 cm$^3$(STP)/g or more. $V_{a(0.50)}$ is more preferably 8 cm$^3$(STP)/g or less. More preferably, $\Delta V_{d-a}$ does not continuously take values of 3 cm$^3$(STP)/g or more.

Preferably, the average particle size of the secondary particle (50% median particle size according to the laser scattering method) is in the range of 0.5 to 100 μm from the viewpoint of packing properties. From the viewpoint of battery properties, the shape of the secondary particle is preferably isotropic, and more preferably spherical or polyhedral. The primary particle that forms the secondary particle is not particularly limited. The primary particle preferably has an average particle size (50% median particle size according to the electron microscopy) in the range of 0.01 to 2.0 μm because the particle size of the secondary particle in the range is easily obtained. The primary particle preferably has an isotropic shape such as a spherical or polyhedral shape because the secondary particle of an isotropic shape is easily obtained. The secondary particle is in a state where the primary particles are strongly bound to each other. The primary particles are not agglomerated by interaction between particles such as a van der Waals force, nor mechanically press compacted. Accordingly, the secondary particles are not easily broken in ordinary mechanical crushing that is industrially used, and most thereof remains as the secondary particle.

The lithium titanate according to the present invention is preferably those represented by the compositional formula $Li_xTi_yO_4$, and more preferably a single phase of lithium titanate. However, titanium oxide may be slightly mixed in the range where the advantageous effects of the invention are not impaired. As the values x and y in the compositional formula, the value of x/y is preferably in the range of 0.5 to 2. Particularly preferable is a spinel type represented by the compositional formula $Li_4Ti_5O_{12}$.

In the present invention, the surface of the secondary particle may be coated with at least one selected from inorganic compounds such as silica and alumina and organic compounds such as a surface active agent and a coupling agent. In these coating species, one thereof can be carried, two or more thereof can be laminated as a plurality of carrying layers, or two or more thereof can be carried as a mixture or a complex product.

Alternatively, the inside and surface of the secondary particle of the lithium titanate can contain carbon. The containing of carbon is preferable because electrical conductivity is improved. The amount of carbon to be contained is preferably in the range of 0.05 to 30% by weight in terms of C. At an amount less than the range, a desired electrical conductivity is not obtained. At an amount more than the range, inactive material components within an electrode are undesirably increased to reduce the capacity of the battery. More preferably, the amount of carbon to be contained is in the range of 0.1 to 15% by weight. The amount of carbon can be analyzed by the CHN analysis method, high frequency combustion method, or the like.

Alternatively, the secondary particle can contain a different metal element other than titanium and lithium. The different metal element is preferably magnesium, aluminum, zirconium, and the like. One or two or more thereof can be used. The amount of the different metal element to be contained is preferably in the range of 0.05 to 15% by weight in terms of Mg, Al, or Zr. More preferably, the amounts of Al and Mg are in the range of 0.05 to 10% by weight, and the amount of Zr is in the range of 0.1 to 10% by weight. The amounts of Al and Mg are still more preferably in the range of 0.1 to 5% by weight. The amount of the different metal element can be analyzed by the inductively coupled plasma (ICP) method, for example.

Next, the present invention is a process for production of a lithium titanate, comprising the steps of: drying and granulating a slurry comprising a crystalline titanium oxide, a titanic acid compound, and a lithium compound; and firing a resultant product to obtain lithium titanate secondary particles, wherein (1) the crystalline titanium oxide comprising at least two kinds of crystalline titanium oxide particles having a different average particle sizes is used (hereinafter, referred to as a process (1) in some cases), and/or (2) an amount of the crystalline titanium oxide to be used is more than 4 times larger than that of the titanic acid compound in the weight ratio in terms of $TiO_2$ (hereinafter, referred to as a process (2) in some cases).

In the present invention, first, starting substances such as a crystalline titanium oxide, a titanic acid compound, and a lithium compound are added to a medium solution to prepare a slurry comprising these starting substances. For industrial advantages, the concentration of the titanium component in the slurry is preferably in the range of 120 to 300 g/L in terms of $TiO_2$, and more preferably in the range of 150 to 250 g/L. As the medium solution, water or organic solvent such as alcohols, or a mixture thereof can be used. Industrially, water or an aqueous medium solution containing water as a main component is preferably used. The order to add the starting substances to the medium solution is not limited. Preferably, the lithium compound is added to the medium solution in advance, and subsequently the crystalline titanium oxide and the titanic acid compound are added. Thereby, an increase in the viscosity of the slurry and gelation of the slurry are suppressed. The temperature of the medium solution containing the lithium compound is preferably in the range of 25 to 100° C. because the reaction of the titanic acid compound with the lithium compound at a stage of preparing the slurry progresses and lithium titanate is easily obtained during firing. The temperature is more preferably in the range of 50 to 100° C. The crystalline titanium oxide and the titanic acid compound may be added to the medium solution containing the lithium compound separately, simultaneously, or as a mixture thereof.

In the case where the reaction is performed in water or an aqueous medium solution containing water as a main component, a water-soluble lithium compound such as lithium hydroxide, lithium carbonate, lithium nitrate, and lithium sulfate is preferably used as the lithium compound. Among these, lithium hydroxide is preferable because of its high reactivity.

As the titanic acid compound, metatitanic acid represented by $TiO(OH)_2$ or $TiO_2.H_2O$, orthotitanic acid represented by $Ti(OH)_4$ or $TiO_2.2H_2O$, or a mixture thereof can be used, for example. The titanic acid compound is obtained by heat hydrolysis or neutralization hydrolysis of a hydrolyzable titanium compound. For example, metatitanic acid is obtained by heat hydrolysis of titanyl sulfate ($TiOSO_4$), neutralization hydrolysis of titanium chloride under a high temperature, or the like. Orthotitanic acid is obtained by neutralization hydrolysis of titanium sulfate ($Ti(SO_4)_2$) or titanium chloride ($TiCl_4$) under a low temperature. A mixture of metatitanic acid and orthotitanic acid is obtained by properly controlling the temperature at neutralization hydrolysis of titanium chloride. Examples of a neutralizer used in neutralization hydrolysis include ammonia and ammonium compounds such as ammonium carbonate, ammonium sulfate, and ammonium nitrate, and the neutralizer, if used, can be decomposed and volatilized during firing. As the titanium compound, other than the inorganic titanium compounds such as titanium sulfate, titanyl sulfate, and titanium chloride, organic titanium compounds such as titanium alkoxide may also be used.

As the crystalline titanium oxide, titanium dioxide represented by the compositional formula $TiO_2$ is preferably used. The crystal systems of titanium dioxide is not limited, and an anatase type, a rutile type, a brookite type, and the like can be used. The crystalline titanium oxide may have a single crystal phase, or may be a mixed crystal phases that contains two or more crystal systems and may be partially amorphous. The average particle size of the crystalline titanium oxide particles is preferably in the range of 0.01 to 0.4 µm. At an average particle size in the range, an increase in the viscosity of the slurry is suppressed even in a high concentration. The crystalline titanium oxide can be obtained by a known process for production of a titanium dioxide pigment, for example, the so-called sulfuric acid method of heat hydrolyzing and firing titanyl sulfate, the so-called chlorine method of gaseous phase oxidizing titanium tetrachloride.

In the process (1), two or three or more of the crystalline titanium oxide particles having different average particle sizes can be used. If other crystalline titanium oxide particles have an average particle size 1.3 or more times, preferably 1.3 or more times and 40 or less times, more preferably 1.3 or more times and 10 or less times, and still more preferably 1.3 or more times and 3.5 or less times larger than that of the crystalline titanium oxide particle having the smallest average particle size, the advantageous effects of the invention can be easily obtained. The crystals systems of the respective particles may be the same or different. The average particle size is the 50% median particle size according to the electron microscopy, and a preferable average particle size of the crystalline titanium oxide particle having the smallest average particle size is 0.01 to 0.20 µm. The average particle sizes of the other crystalline titanium oxide particles can be properly adjusted according to the smallest average particle size by granulation into a secondary particle. Alternatively, if the primary particle of the crystalline titanium oxide is used, the average particle size is preferably in the range of 0.05 to 0.40 µm. The weight of the crystalline titanium oxide having an average particle size that is 1.3 or more times larger than that of the crystalline titanium oxide having the smallest average particle size is in the range of 0.1 to 5 times the weight of the crystalline titanium oxide having the smallest average particle size. In the case where there exist a plurality of the crystalline titanium oxides having the average particle size 1.3 or more times larger than that of the crystalline titanium oxide having the minimal average particle size, the total weight thereof is used as a reference. The total amount of the crystalline titanium oxide particles to be used is preferably in the range of 1 to 10 times larger than that of the titanic acid compound in the weight ratio in terms of $TiO_2$ because the lithium titanate can be produced with industrial advantages.

In the process (2), the amount of the crystalline titanium oxide to be used particularly has no upper limit as long as the amount is more than 4 times and preferably 4.2 or more times larger than that of the titanic acid compound. The amount 10 or less times larger than that of the titanic acid compound is preferable because the viscosity of the slurry is suitable for drying and granulation. The crystalline titanium oxide may be one kind of crystalline titanium oxide particle, or two or more kind of crystalline titanium oxide particles having different average particle sizes or crystal systems.

The slurry is dried and granulated, and subsequently fired to obtain the lithium titanate. As a method for granulating with drying, a known method can be used. Examples of the known method include (A) a method in which a slurry is spray-dried and granulated into a secondary particle, and (B) a method in which a solid contained in a slurry is dehydrated and dried, and then the solid thus dried is crushed and granulated into secondary particles having a desired size. Particularly, the method (A) is preferable because control of the particle size is easy and a spherical secondary particle can be easily obtained. A spray drier used for spray drying can be properly selected from a disk type, a pressure nozzle type, a two fluid nozzle type, and a four fluid nozzle type, for example, according to the properties and state of the slurry and the performance of the spray drier. The particle size of the secondary particle is controlled as follows: for example, the concentration of the solid content in the slurry is adjusted, or in the disk type spray drier, the number of rotation of the disk is adjusted, or in the pressure nozzle type, two fluid nozzle type, and four fluid nozzle type spray driers, the spray pressure, the diameter of the nozzle, and the flow rate of each fluid are adjusted thereby to control the size of droplets of the solution to be sprayed. The properties and state of the slurry such as a concentration and viscosity are properly determined according to the ability of the spray drier.

In the case where the slurry has a low viscosity and is difficult to granulate, an organic binder may be used in order to further facilitate control of the particle size. Examples of the organic binder to be used include (1) vinyl compounds (such as polyvinyl alcohol and polyvinylpyrrolidone), (2) cellulose compounds (such as hydroxyethyl cellulose, carboxymethyl cellulose, methyl cellulose, and ethyl cellulose), (3) protein compounds (such as gelatin, gum arabic, casein, sodium caseinate, and ammonium caseinate), (4) acrylic acid compounds (such as sodium polyacrylate and ammonium polyacrylate), (5) natural polymer compounds (such as starch, dextrin, agar, and sodium alginate), (6) synthetic polymer compounds (such as polyethylene glycol), and at least one selected from these can be used. Among these, more preferable are those containing no inorganic component such as soda because those are easily decomposed and volatilized by firing.

The firing temperature depends on the firing atmosphere or the like. In order to produce lithium titanate, the firing temperature may be approximately 550° C. or more. In order to prevent sintering between the secondary particles, the firing temperature is preferably 1000° C. or less. From the viewpoint of acceleration of production of $Li_4Ti_5O_{12}$ and improvement of the rate characteristics, the firing temperature is more preferably in the range of 550 to 850° C., and still more preferably in the range of 650 to 850° C. The firing atmosphere can be properly selected from in the air, a non-oxidizing atmosphere, and the like. After firing, if the obtained lithium titanate secondary particles are sintered and agglomerated, the obtained lithium titanate secondary particles may be crushed when necessary using a flake crusher, a hammermill, a pin mill, a bantam mill, a jet mill, or the like.

The present invention may further comprise the step of adding carbon to the lithium titanate secondary particles. Examples of a specific method of adding the carbon include (A) a method in which the slurry comprising a crystalline titanium oxide, a titanic acid compound, and a lithium compound is granulated with drying, and then the resultant product is fired, followed by firing an obtained fired product again in the presence of a carbon-containing substance, and (B) a method in which the slurry comprises a crystalline titanium oxide, a titanic acid compound, a lithium compound, and a carbon-containing substance, the slurry is dried and granulated, and the resultant product is fired. The firing temperature in the presence of the carbon-containing substance is preferably in the range of 150 to 1000° C. in the case of (A), and in the range of 550 to 1000° C. in the case of (B) in which range the lithium titanate is easily produced. The firing atmosphere can be properly selected from in the air, a non-oxidizing atmosphere, and the like. Preferably, firing is performed under a non-oxidizing atmosphere.

Examples of the carbon-containing substance include carbon black, acetylene black, ketjen black, and organic compounds. The organic compounds may be preheated and thermally decomposed for use. In the case where the organic compound is used, hydrocarbon compounds and/or oxygen-containing hydrocarbon compounds in which a component other than carbon is difficult to remain are preferable. Examples of the hydrocarbon compounds include (1) alkane compounds (such as methane, ethane, and propane), (2) alkene compounds (such as ethylene and propylene), (3) alkyne compounds (such as acetylene), (4) cycloalkane compounds (such as cyclohexane), and (5) aromatic compounds (such as benzene, toluene, and xylene). Examples of the oxygen-containing hydrocarbon compounds include (1) alcohol compounds (such as (a) monohydric alcohols (such as methanol, ethanol, and propanol), (b) dihydric alcohols (such as ethylene glycol), (c) trihydric alcohols (such as trimethylol ethane and trimethylol propane), (d) polyalcohols (such as polyvinyl alcohol)), (2) ether compounds (such as (a) ether monomers (such as diethyl ether and ethyl methyl ether), (b) polyethers (such as polyethylene glycol, polyethylene oxide, and polypropylene ether)), (3) carboxylic acid compounds (such as (a) oxycarboxylic acids (such as citric acid and malic acid), (b) monocarboxylic acids (such as acetic acid and formic acid), (c) dicarboxylic acids (such as oxalic acid and malonic acid), (d) aromatic carboxylic acids (such as benzoic acid)), (4) aldehyde compounds (such as formaldehyde and acetaldehyde), (5) phenol compounds (such as phenol, catechol, and pyrogallol), and (6) saccharides (such as glucose, sucrose, and cellulose). In the case where drying and granulation are performed by spray drying, a compound serving a binder such as polyalcohols and polyethers can be selected as the organic compound.

Moreover, a step of adding a different metal element other than titanium and lithium to the lithium titanate secondary particles can be provided. Examples of a specific method of adding the different metal element to the secondary particles include (A) a method in which a compound of a different metal element is added to the slurry comprising a crystalline titanium oxide, a titanic acid compound, and a lithium compound, and (B) a method in which the slurry comprises a crystalline titanium oxide containing a different metal element, a titanic acid compound, and a lithium compound, the slurry is dried and granulated, and the resultant product is fired. In the method (A), the compound of a different metal element can be mixed with the crystalline titanium oxide or the titanic acid compound in advance. In the case of the crystalline titanium oxide, the surface of the particle may be coated with the compound of a different metal element to obtain a mixture. In the case of the titanic acid compound, a hydrolyzable titanium compound may be hydrolyzed in the presence of the compound of a different metal element to obtain a mixture. The crystalline titanium oxide containing a different metal element for use in the method (B) is obtained by mixing the titanium compound with the compound of a different metal element and firing the mixture. The compound of a different metal element is properly selected from oxides, hydrous oxides, chlorides, carbonates, nitric acid salts, sulfuric acid salts, and the like of different metal elements, depending on the methods (A) and (B).

Next, the present invention is an electrode active material comprising the lithium titanate. Moreover, the present invention is an electricity storage device comprising an electrode containing the electrode active material mentioned above. Examples of the electricity storage device specifically include lithium batteries and lithium capacitors. These include an electrode, a counter electrode, a separator, and an electrolyte solution. The electrode is obtained by adding a conductive material and a binder to the active material, and properly molding the mixture or applying the mixture to a plate. Examples of the conductive material include carbon-containing substances such as carbon black, acetylene black, and ketjen black. Examples of the binder include fluorinated resins such as polytetrafluoroethylene, polyvinylidene fluoride, and fluorinated rubbers, rubber binders such as styrene butadiene, and water-soluble resins such as carboxymethyl cellulose and polyacrylic acid. In the case of the lithium batteries, the electrode active material mentioned above can be used as the positive electrode, and metallic lithium, a lithium alloy, or a carbon-containing substance such as graphite can be used as the counter electrode. Alternatively, the electrode active material mentioned above can be used as the negative electrode, and lithium and transition metal complex oxides such as lithium manganese oxide, lithium cobalt oxide, lithium nickel oxide, and lithium vanadium oxide, and olivine compounds such as lithium iron phosphoric acid compound can be used as the positive electrode. In the case of the capacitors, an asymmetric capacitor using the electrode active material and a carbon-containing substance such as graphite or activated carbon can be formed. As the separator, a porous polyethylene film or the like is used in both cases. As the electrolyte solution, an ordinary material can be used, for example, those obtained by dissolving a lithium salt such as LiPF$_6$, LiClO$_4$, LiCF$_3$SO$_3$, LiN(CF$_3$SO$_2$)$_2$, and LiBF$_4$ in a solvent such as propylene carbonate, ethylene carbonate, dimethyl carbonate, diethyl carbonate, ethyl methyl carbonate, γ-butyllactone, and 1,2-dimethoxyethane.

Further, the present invention is another electricity storage device comprising an electrode which contains the electrode active material but which contains no conductive material. Lithium titanate has electric insulation. For this reason, charge and discharge capacity is conventionally hard to obtain without using any conductive material, e.g., a carbon-containing substance such as carbon black, acetylene black, and ketjen black. In the electricity storage device according to the present invention, however, sufficient charge and discharge capacity is practically obtained without using a conductive material. Moreover, the electricity storage device has excellent rate property. In the present invention, that the electrode "contains no conductive material" includes the state where a conductive material is not added to the electrode, and the state where the inside and surface of the lithium titanate contain no conductive material such as carbon. The electrode active material used for the counter electrode of the electrode, the binder, the electrolyte solution, and the like described above can be used.

EXAMPLES

Hereinafter, Examples according to the present invention will be shown, but the present invention will not be limited to these.

Example 1

Production Process (1)

To 340 mL of a 4.5-mol/L lithium hydroxide aqueous solution, 50 g of a crystalline titanium dioxide particle (a) (anatase form) having an average particle size of 0.10 μm and 50 g of a crystalline titanium dioxide particle (b) (mixed crystal phase of an anatase type and a rutile type) having an average particle size of 0.07 μm were added, and dispersed. While the slurry was stirred, the temperature of the solution was kept at 80° C., and 650 mL of an aqueous slurry prepared by dispersing 50 g of a titanic acid compound (orthotitanic acid) in terms of TiO$_2$ was added to obtain a slurry comprising a crystalline titanium oxide, a titanic acid compound, and a lithium compound. The slurry was spray-dried using a GB210-B spray drier (made by Yamato Scientific Co., Ltd.) under the condition of an inlet temperature of 190° C. and an outlet temperature of 80° C. to obtain a dried and granulated product. Then, the dried and granulated product was fired in the air at a temperature of 700° C. for 3 hours to obtain a lithium titanate (Sample A) according to the present invention represented by the compositional formula Li$_4$Ti$_5$O$_{12}$. The average particle size of the crystalline titanium dioxide particle was measured using a transmission electron microscope H-7000 and an image diffractometer LUZEX IIIU (both are made by Hitachi, Ltd.).

Example 2

Production Process (1)

To 340 mL of a 4.5-mol/L lithium hydroxide aqueous solution, 85.7 g of a crystalline titanium dioxide particle (b) (mixed crystal of an anatase form and a rutile form) having an average particle size of 0.07 μm and 21.5 g of a crystalline titanium dioxide particle (c) (mixed crystal of an anatase form and a rutile form) having an average particle size of 0.13 μm were added, and dispersed. While the slurry was stirred, the temperature of the solution was kept at 80° C., 420 mL of an aqueous slurry prepared by dispersing 42.9 g of a titanic acid compound (orthotitanic acid) in terms of TiO$_2$ was added to obtain a slurry comprising a crystalline titanium oxide, a titanic acid compound, and a lithium compound. Subsequently, the dried and granulated product was prepared and fired in the same manner as in Example 1 to obtain a lithium titanate (Sample B) according to the present invention represented by the compositional formula Li$_4$Ti$_5$O$_{12}$.

Example 3

Production Process (1)

50 g of the lithium titanate obtained in Example 1 (Sample A) was uniformly mixed with 2.5 g of polyethylene glycol, and the mixture was fired under a nitrogen atmosphere at a temperature of 500° C. for 2 hours to obtain a lithium titanate (Sample C) according to the present invention. According to analysis using a CHN elemental analyzer Vario EL III (made by Elementar Analysensysteme GmbH), it turned out that Sample C contains 0.80% by weight of carbon in terms of C.

Example 4

Production Process (1)

A lithium titanate (Sample D) according to the present invention containing 2.1% by weight of magnesium in terms of Mg was obtained in the same manner as in Example 1 except that the amounts of the crystalline titanium dioxide particles (a) and (b) and the titanic acid compound to be used in Example 1 each were 53.2 g in terms of TiO$_2$, the amount of the aqueous slurry of the titanic acid compound to be added was 680 mL, and 8.8 g of magnesium hydroxide (containing 3.5 g of Mg) was further added. The amount of magnesium was measured using an ICP optical emission spectrometer SPS-3100 (made by Seiko Instruments Inc.).

Example 5

Production Process (1)

A lithium titanate (Sample E) according to the present invention containing aluminum was obtained in the same manner as in Example 1 except that the amounts of the crystalline titanium dioxide particles (a) and (b) and the titanic acid compound to be used in Example 1 each were 54.5 g in terms of TiO$_2$, the amount of the aqueous slurry of the titanic acid compound to be added was 690 mL, and 12.3 g of aluminum hydroxide (containing 4.1 g of Al) was further added. The content of aluminum in Sample E was measured in the same manner as in Example 4, and it was 2.3% by weight in terms of Al.

Example 6

Production Process (1)

A lithium titanate (Sample F) according to the present invention containing 8.4% by weight of zirconium in terms of Zr was obtained in the same manner as in Example 1 except that the amounts of the crystalline titanium dioxide particles (a) and (b) and the titanic acid compound to be used in Example 1 each were 53.2 g in terms of TiO$_2$, the amount of the aqueous slurry of the titanic acid compound to be added was 680 mL, and 9.3 g of zirconium oxide (containing 6.9 g of Zr) was further added.

Example 7

Production Process (2)

To 340 mL of a 4.5-mol/L lithium hydroxide aqueous solution, 125 g of the crystalline titanium dioxide particle (b) having an average particle size of 0.07 μm was added, and dispersed. While the slurry was stirred, the temperature of the solution was kept at 80° C., 250 mL of an aqueous slurry prepared by dispersing 25 g of the titanic acid compound (orthotitanic acid) in terms of $TiO_2$ was added to obtain a slurry comprising a crystalline titanium oxide, a titanic acid compound, and a lithium compound. Subsequently, the dried and granulated product was prepared and fired in the same manner as in Example 1 to obtain a lithium titanate (Sample G) according to the present invention represented by the compositional formula $Li_4Ti_5O_{12}$.

Comparative Example 1

To 340 mL of a 4.5-mol/L lithium hydroxide aqueous solution, 75 g of the crystalline titanium dioxide particle (b) having an average particle size of 0.07 μm was added, and dispersed. While the slurry was stirred, the temperature of the solution was kept at 80° C., and 720 mL of an aqueous slurry prepared by dispersing 75 g of the titanic acid compound (orthotitanic acid) in terms of $TiO_2$ was added to obtain a slurry comprising a crystalline titanium oxide, a titanic acid compound, and a lithium compound. Subsequently, the dried and granulated product was prepared and fired in the same manner as in Example 1 to obtain a lithium titanate (Sample H) for comparison represented by the compositional formula $Li_4Ti_5O_{12}$.

Comparative Example 2

A lithium titanate (Sample I) for comparison represented by the compositional formula $Li_4Ti_5O_{12}$ was obtained in the same manner as in Comparative Example 1 except that the amount of the crystalline titanium dioxide particle (b) to be used in Comparative Example 1 was 111.5 g, the amount of the titanic acid compound (orthotitanic acid) to be used in Comparative Example 1 was 38.5 g in terms of $TiO_2$, and 375 mL of the aqueous slurry was added.

Comparative Example 3

To 340 mL of a 4.5-mol/L lithium hydroxide aqueous solution, 1500 mL of an aqueous slurry prepared by dispersing 150 g of the titanic acid compound (orthotitanic acid) in terms of $TiO_2$ was added, and the temperature of the solution was kept at 80° C. while the solution was stirred. Thus, a slurry comprising a titanic acid compound and a lithium compound was obtained. Subsequently, the dried and granulated product was prepared and fired in the same manner as in Example 1 to obtain a lithium titanate (Sample J) for comparison represented by the compositional formula $Li_4Ti_5O_{12}$.

Examples 8 to 14

Each of the lithium titanates (Samples A to G) obtained in Examples 1 to 7, acetylene black powder as a conductive material, and a polyvinylidene fluoride resin as a binder were mixed in a weight ratio of 100:5:7, and kneaded in a mortar to prepare a paste. The paste was applied onto an aluminum foil, and dried at a temperature of 120° C. for 10 minutes. Then, the aluminum foil was blanked out into a circular shape having a diameter of 12 mm, and pressed at 17 MPa to form a working electrode. The amount of the active material contained in the electrode was 3 mg.

The working electrode was vacuum dried at a temperature of 120° C. for 4 hours, and incorporated as a positive electrode into a sealable coin cell in a glovebox at a dew point of −70° C. or less. A stainless steel (SUS316) coin cell having an outer diameter of 20 mm and a height of 3.2 mm was used. The negative electrode prepared by molding metallic lithium having a thickness of 0.5 mm into a circular shape having a diameter of 12 mm was used. As a nonaqueous electrolytic solution, a mixed solution of ethylene carbonate and dimethyl carbonate (mixed in a volume ratio of 1:2) in which $LiPF_6$ was dissolved such that the concentration might be 1 mol/L was used.

The working electrode was disposed in the lower can of the coin cell. A porous polypropylene film was disposed on the working electrode as a separator. A nonaqueous electrolytic solution was dropped over the porous polypropylene film. On the porous polypropylene film, the negative electrode, and a spacer with a thickness of 0.5 mm for adjusting the thickness and a spring (both made of SUS316) were disposed, and covered with the upper can with a propylene gasket. The edge of the outer periphery was caulked to be sealed. Thus, electricity storage devices (Samples K to Q) according to the present invention were obtained. The respective samples are Examples 8 to 14.

Example 15

An electricity storage device (Sample R) according to the present invention was obtained in the same manner as in Example 8 except that without using acetylene black in Example 8, Sample A and the polyvinylidene fluoride resin were mixed in a weight ratio of 100:7 to prepare a paste.

Comparative Examples 4 to 6

Electricity storage devices (Samples S to U) for comparison were obtained in the same manner as in Example 8 except that instead of Sample A in Example 8, Samples H to J obtained in Comparative Examples 1 to 3 were used. The respective samples are Comparative Examples 4 to 6.

Example 16

The lithium titanate (Sample A) obtained in Example 1, acetylene black powder as the conductive agent, and a polyvinylidene fluoride resin as the binder were mixed in a weight ratio of 100:3:10, and kneaded in a mortar to prepare a paste. The paste was applied onto an aluminum foil, and dried at a temperature of 120° C. for 10 minutes. Then, the aluminum foil was blanked out into a circular shape having a diameter of 12 mm, and pressed at 17 MPa to form a working electrode. The amount of the active material contained in the electrode was 4 mg.

Commercially available lithium manganate (M01Y01: made by Mitsui Mining & Smelting Co., Ltd.) as the active material, acetylene black as a conductive material, and a polyvinylidene fluoride resin as a binder were kneaded in a weight ratio of 100:10:10. The kneaded product was applied onto an aluminum foil current collector, and dried at a temperature of 120° C. for 10 minutes. The current collector was cut out into a circular shape having a diameter of 12 mm, and pressed at 17 MPa to obtain a positive electrode. The amount of the active material contained in the electrode was 8 mg.

Each of these electrodes was vacuum dried at a temperature of 120° C. for 5 hours, and incorporated into a sealable coin cell for a test in a glovebox at a dew point of −70° C. or less. A stainless steel (SUS316) cell for evaluation having an outer diameter of 20 mm and a height of 3.2 mm was used. The lithium manganate electrode was disposed as the positive electrode in the lower can of the cell for evaluation. A porous polypropylene film was disposed on the positive electrode as the separator. On the porous polypropylene film, the working electrode as the negative electrode, and a spacer with a thickness of 1.0 mm for adjusting the thickness and a spring (both made of SUS316) were disposed. Over them, a mixed solution of ethylene carbonate and dimethyl carbonate (mixed in a volume ratio of 1:2) in which $LiPF_6$ was dissolved to have a concentration of 1 mol/L was dropped as a nonaqueous electrolytic solution. The lower can was covered with the upper can with a propylene gasket, and the edge of the outer periphery was caulked to be sealed. Thus, an electricity storage device according to the present invention (Sample V) was obtained.

Comparative Example 7

An electricity storage device for comparison (Sample W) was obtained in the same manner as in Example 16 except that instead of Sample A in Example 16, Sample J obtained in Comparative Example 3 was used. This is Comparative Example 7.

Evaluation 1: Measurement of Amounts of Nitrogen Adsorbed and Desorbed

Figure 1:
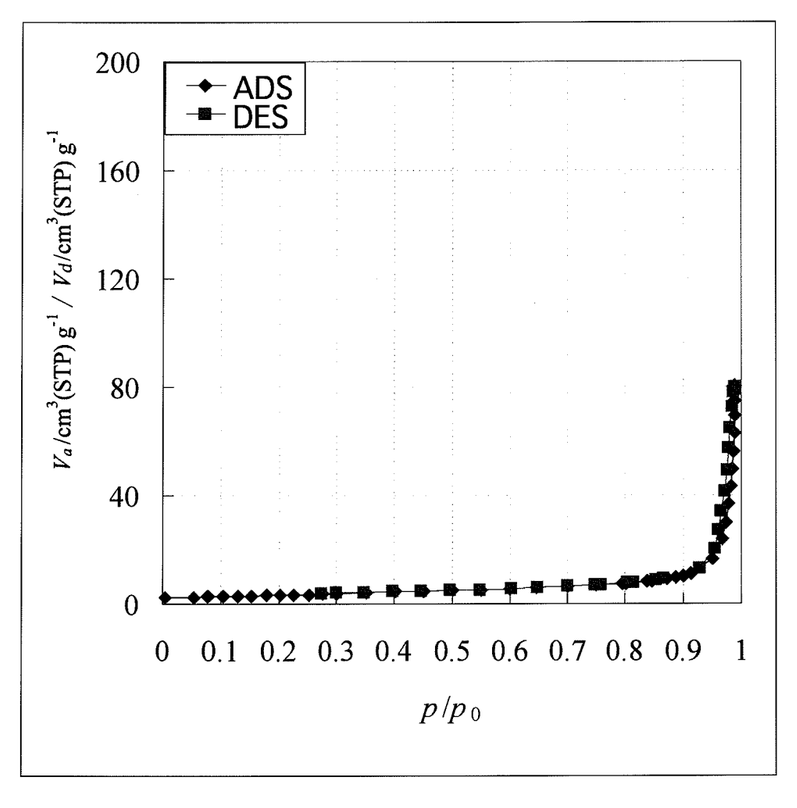
FIG. 1 shows adsorption and desorption isotherms in Example 1 (Sample A).

In the lithium titanates (Samples A to G and J) obtained in Examples 1 to 7 and Comparative Example 3, the amounts of nitrogen adsorbed and desorbed were measured using a high precision automatic gas adsorption amount measuring apparatus (BELSORP-mini II: made by BEL Japan, Inc.). Approximately 1 g of a sample was placed in a measurement cell vacuum degassed approximately for 1 day. Using a pretreatment apparatus (BELLPREP-vac II: made by BEL Japan, Inc.), vacuum degassing was performed at a temperature of 150° C. for 3 hours. Subsequently, under the liquid nitrogen temperature (77 K), nitrogen gas with high purity was adsorbed and desorbed to obtain adsorption and desorption isotherms. The adsorption and desorption isotherms of Sample A are shown in FIG. 1. In FIG. 1, "ADS" represents the adsorption isotherm, "DES" represents the desorption isotherm, "p/p0" represents a relative pressure, "$V_a$" represents the amount adsorbed, and "$V_d$" represents the amount desorbed. The amounts ($V_{a(0.99)}$, $V_{a(0.50)}$) of nitrogen adsorbed at a relative pressure of 0.99 and at that of 0.50, and the difference ($\Delta V_{d-a(p)}$) between the amount of nitrogen desorbed and the amount of nitrogen adsorbed when the measurement was made at an interval of the relative pressure of 0.05 in the range of 0.45 to 0.90 are shown in Table 1. It is demonstrated that the lithium titanates according to the present invention have $V_{a(0.99)}$ of 50 $cm^3$(STP)/g or more, and have macropores on the surface of the secondary particle. It is also demonstrated that lithium titanates according to the present invention have few mesopores and micropores because $V_{a(0.50)}$ is 10 $cm^3$(STP)/g or less, $\Delta V_{d-a(p)}$ does not continuously take values of 5 $cm^3$(STP)/g or more, and the adsorption and desorption isotherms have no hysteresis.

TABLE 1

| | Sample | $V_{a(0.99)}$ | $V_{a(0.50)}$ | $\Delta V_{d-a(0.45)}$ | $\Delta V_{d-a(0.50)}$ | $\Delta V_{d-a(0.55)}$ | $\Delta V_{d-a(0.60)}$ | $\Delta V_{d-a(0.65)}$ |
|---|---|---|---|---|---|---|---|---|
| Example 1 | A | 80.7 | 4.9 | 0.1 | 0.1 | 0.1 | 0.1 | 0.1 |
| Example 2 | B | 76.1 | 3.8 | 0.1 | 0.1 | 0.1 | 0.1 | 0.1 |
| Example 3 | C | 89.7 | 4.0 | 0.6 | 0.7 | 0.8 | 0.9 | 1.0 |
| Example 4 | D | 168.4 | 7.2 | 0.8 | 1.0 | 1.2 | 1.3 | 1.4 |
| Example 5 | E | 77.6 | 3.5 | 1.0 | 1.1 | 1.5 | 1.4 | 1.5 |
| Example 6 | F | 58.4 | 3.8 | 0.2 | 0.2 | 0.3 | 0.3 | 0.3 |
| Example 7 | G | 85.1 | 3.7 | 0.1 | 0.1 | 0.1 | 0.1 | 0.1 |
| Comparative Example 3 | J | 19.6 | 0.0 | 0.0 | 0.1 | 0.1 | 0.1 | 0.1 |

| | $\Delta V_{d-a(0.70)}$ | $\Delta V_{d-a(0.75)}$ | $\Delta V_{d-a(0.80)}$ | $\Delta V_{d-a(0.85)}$ | $\Delta V_{d-a(0.90)}$ |
|---|---|---|---|---|---|
| Example 1 | 0.1 | 0.2 | 0.1 | 0.3 | 0.7 |
| Example 2 | 0.2 | 0.3 | 0.2 | 0.1 | 0.8 |
| Example 3 | 1.0 | 1.1 | 1.0 | 1.3 | 1.0 |
| Example 4 | 1.5 | 1.7 | 1.8 | 2.7 | 1.6 |
| Example 5 | 1.7 | 1.8 | 1.9 | 1.9 | 2.0 |
| Example 6 | 0.3 | 0.4 | 0.5 | 0.3 | 0.9 |
| Example 7 | 0.2 | 0.2 | 0.2 | 0.2 | 0.4 |
| Comparative Example 3 | 0.1 | 0.2 | 0.2 | 0.2 | 0.0 |

(Units: $cm^3$ (STP)/g)

Evaluation 2: Evaluation of Rate Property in Electricity Storage Device Using Lithium Titanate as Positive Electrode Active Material In the electricity storage devices (Samples K to U) obtained in Examples 8 to 15 and Comparative Examples 4 to 6, a discharge capacity was measured at a variety of the current amount, and a capacity retention (%) was calculated. The measurement was made at a voltage in the range of 1 to 3 V, at a charge current of 0.25 C, and at a discharge current in the range of 0.25 C to 30 C. The environmental temperature was 25° C. The capacity retention was calculated by the expression ($X_n/X_{0.25}$)×100 wherein the measured value of the discharge capacity at 0.25 C was $X_{0.25}$, and the measured value thereof in the range of 0.5 C to 30 C was $X_n$. Here, 1 C refers to the current value that can be fully charged in 1 hour, and in the present evaluation, 0.48 mA is equivalent to 1 C. A higher capacity retention means higher rate characteristics. The result is shown in Table 2. It turned out that the electricity storage devices according to the present invention have a capacity retention of 70% or more at 30 C, and high rate characteristics. The electricity storage device according to the present invention containing no conductive material has high rate characteristics equal to those of the electricity storage device containing a conductive material.

TABLE 2

| Sample | | Capacity retention (%) | | | | | |
|---|---|---|---|---|---|---|---|
| | | 0.5 C | 1 C | 5 C | 10 C | 20 C | 30 C |
| Example 8 | K | 100.0 | 99.6 | 97.6 | 93.1 | 86.0 | 82.6 |
| Example 9 | L | 100.0 | 98.0 | 92.4 | 85.8 | 76.5 | 71.6 |
| Example 10 | M | 100.0 | 99.0 | 92.0 | 87.8 | 79.5 | 71.3 |
| Example 11 | N | 100.0 | 98.9 | 93.8 | 90.5 | 80.9 | 73.9 |
| Example 12 | O | 99.7 | 99.0 | 96.7 | 91.8 | 84.8 | 76.3 |
| Example 13 | P | 100.0 | 99.9 | 98.6 | 94.6 | 86.5 | 82.5 |
| Example 14 | Q | 100.0 | 99.2 | 96.0 | 94.6 | 82.3 | 88.7 |
| Example 15 | R | 100.0 | 99.3 | 93.6 | 91.8 | 89.6 | 87.1 |
| Comparative Example 4 | S | 100.0 | 91.5 | 75.1 | 67.7 | 55.4 | 47.7 |
| Comparative Example 5 | T | 100.0 | 97.5 | 89.5 | 83.9 | 72.1 | 64.9 |
| Comparative Example 6 | U | 100.0 | 74.3 | 41.3 | 28.8 | 16.8 | 10.7 |

Evaluation 3: Evaluation of Rate Property in Electricity Storage Device Using Lithium Titanate as Negative Electrode Active Material In the electricity storage devices (Samples V and W) obtained in Example 16 and Comparative Example 7, a discharge capacity was measured at a variety of the current amount, and a capacity retention (%) was calculated. The electricity storage device was produced, and aged for 3 hours, and conditioning was performed by 2-cycle charging and discharging at 0.25 C. Subsequently, the measurement was made at a voltage in the range of 1.5 to 2.8 V, at a discharge current of 0.25 C, and at a charge current in the range of 0.25 C to 10 C. The environmental temperature was 25° C. The capacity retention was calculated by the expression $(X_n/X_{0.25}) \times 100$ wherein the measured value of the discharge capacity in charging at 0.25 C was $X_{0.25}$, and the measured value thereof in the range of 0.5 C to 10 C was $X_n$. Here, 1 C refers to the current value that can be fully charged in 1 hour, and in the present evaluation, 0.64 mA is equivalent to 1 C. The result is shown in Table 3. It turned out that the electricity storage device according to the present invention has a capacity retention at 10 C of 70% or more, and has excellent rate property even if the lithium titanate according to the present invention is used as the negative electrode active material.

TABLE 3

| Sample | | Capacity retention (%) | | | | |
|---|---|---|---|---|---|---|
| | | 0.5 C | 1 C | 2 C | 5 C | 10 C |
| Example 16 | V | 99.0 | 98.6 | 96.5 | 92.2 | 70.9 |
| Comparative Example 7 | W | 96.9 | 91.3 | 84.0 | 68.3 | 41.9 |

INDUSTRIAL APPLICABILITY

The lithium titanate according to the present invention has good properties for battery particularly excellent rate property and is useful for an electricity storage device.

The invention claimed is:

1. A lithium titanate comprising a secondary particle of aggregated lithium titanate primary particles and having macropores providing porosity on a surface of the secondary particle, and the secondary particle has neither micropores nor mesopores on the surface of the secondary particle, wherein an amount of nitrogen adsorbed at a relative pressure of 0.99 in nitrogen adsorption and desorption isotherms is 50 cm$^3$(STP)/g or more thus determining that the lithium titanate has macropores, and wherein an amount of nitrogen adsorbed at a relative pressure of 0.50 in nitrogen adsorption and desorption isotherms is 10 cm$^3$(STP)/g or less, and a difference between an amount of nitrogen desorbed and an amount of nitrogen adsorbed does not continuously take values of 5 cm$^3$(STP)/g or more when they are measured at relative pressure intervals of 0.05 in a range of 0.45 to 0.90, thus determining that the surface of the secondary particle has neither micropores nor mesopores.

2. The lithium titanate according to claim 1, wherein the lithium titanate is represented by a compositional formula $Li_4Ti_5O_{12}$.

3. The lithium titanate according to claim 1, comprising carbon.

4. The lithium titanate according to claim 1, comprising a different metal element.

5. The lithium titanate according to claim 4, wherein the different metal element is at least one selected from magnesium, aluminum, and zirconium.

6. An electrode active material, comprising the lithium titanate according to claim 1.

7. An electricity storage device comprising an electrode containing the electrode active material according to claim 6.

8. An electricity storage device, comprising an electrode which contains the electrode active material according to claim 6 but which contains no conductive agent.

\* \* \* \* \*